United States Patent
Quirion

(10) Patent No.: US 8,425,174 B2
(45) Date of Patent: Apr. 23, 2013

(54) CARGO LOADER FOR AN AIRCRAFT WITH ADJUSTING MECHANISM

(75) Inventor: Patrick Quirion, Sherbrooke (CA)

(73) Assignee: TLD (Canada) Inc., Sherbrooke (CA)

( * ) Notice: Subject to any disclaimer, the term of this patent is extended or adjusted under 35 U.S.C. 154(b) by 261 days.

(21) Appl. No.: 13/059,563

(22) PCT Filed: Aug. 18, 2009

(86) PCT No.: PCT/CA2009/001161
§ 371 (c)(1),
(2), (4) Date: Feb. 17, 2011

(87) PCT Pub. No.: WO2010/020049
PCT Pub. Date: Feb. 25, 2010

(65) Prior Publication Data
US 2011/0142583 A1 Jun. 16, 2011

Related U.S. Application Data

(60) Provisional application No. 61/090,046, filed on Aug. 19, 2008.

(51) Int. Cl.
*B60P 1/04* (2006.01)

(52) U.S. Cl.
USPC ............... 414/471; 414/470; 414/495; 74/53; 74/54; 74/55; 74/56; 248/371

(58) Field of Classification Search .................... 14/69.5, 14/70, 71.1, 71.7, 72.5; 74/53–56, 107, 567, 74/568 FS, 568 M, 568 R, 568 T, 569; 108/7; 180/41; 280/6.15, 6.151, 6.16; 414/341, 414/345, 346, 347
See application file for complete search history.

(56) References Cited

U.S. PATENT DOCUMENTS

| | | | | |
|---|---|---|---|---|
| 1,406,477 A | * | 2/1922 | Morrill | 125/35 |
| 3,623,617 A | * | 11/1971 | Nemessanyi | 414/640 |
| 3,822,865 A | * | 7/1974 | Koblo | 366/233 |
| 4,037,738 A | * | 7/1977 | Johnson | 414/389 |
| 4,408,739 A | * | 10/1983 | Buchsel | 244/137.1 |
| 4,662,809 A | * | 5/1987 | Sturtz et al. | 414/347 |
| 5,110,153 A | * | 5/1992 | Kallansrude et al. | 180/41 |

(Continued)

FOREIGN PATENT DOCUMENTS

| | | |
|---|---|---|
| DE | 29 05 236 A1 | 8/1980 |
| EP | 0 559 940 A1 | 9/1993 |

(Continued)

*Primary Examiner* — Paul T Chin
*Assistant Examiner* — Brendan Tighe
(74) *Attorney, Agent, or Firm* — McDermott Will & Emery LLP

(57) ABSTRACT

This invention concerns an aircraft cargo loader for lifting cargo and freight onto and off an aircraft or plane by the loader comprises a longitudinal deck platform; a supporting assembly extending under the platform for supporting and moving the deck platform between a raised position and a lowered position; and an adjusting mechanism installed in connection with a front transverse shaft of the supporting assembly for transversally tilting the platform between a first tilt angular position where one of the longitudinal side of the platform is tilted with respect to the other longitudinal side; a neutral angular position; and a second tilt position where the other longitudinal side of the platform is tilted with respect to said one longitudinal side. The loader also comprises an actuator to actuate the rotational movement of the front transverse shaft.

13 Claims, 10 Drawing Sheets

U.S. PATENT DOCUMENTS

| | | | | |
|---|---|---|---|---|
| 5,309,788 A | * | 5/1994 | Summerfield | 74/568 R |
| 5,423,603 A | * | 6/1995 | Reynolds et al. | 366/208 |
| 6,155,652 A | * | 12/2000 | Rotz et al. | 303/2 |
| 6,634,847 B1 | * | 10/2003 | Yeom | 414/416.08 |
| 7,096,591 B2 | * | 8/2006 | Glantz et al. | 33/290 |
| 7,213,343 B2 | * | 5/2007 | Glantz et al. | 33/290 |
| 2005/0226306 A1 | * | 10/2005 | Glantz et al. | 372/109 |
| 2006/0242851 A1 | * | 11/2006 | Glantz et al. | 33/290 |
| 2011/0142583 A1 | * | 6/2011 | Quirion | 414/471 |

FOREIGN PATENT DOCUMENTS

| | | |
|---|---|---|
| GB | 606180 | 8/1948 |
| JP | 11-060176 | 3/1999 |
| WO | WO 2005/018276 A1 | 11/2005 |
| WO | WO 2006/086851 A1 | 8/2006 |

\* cited by examiner

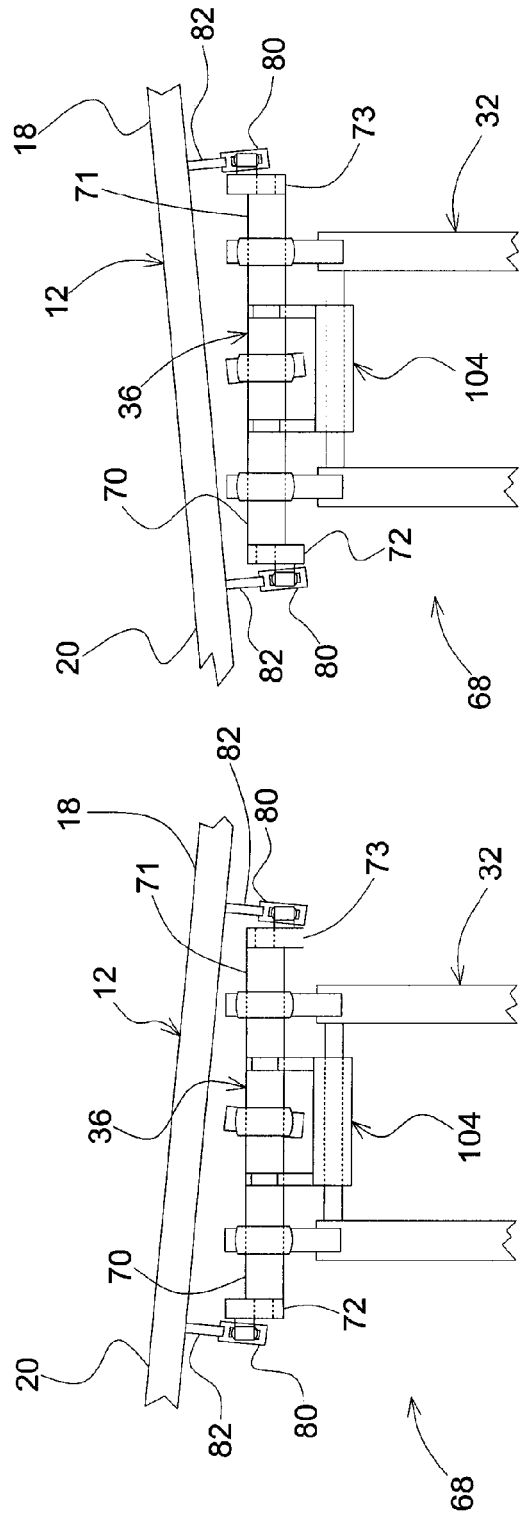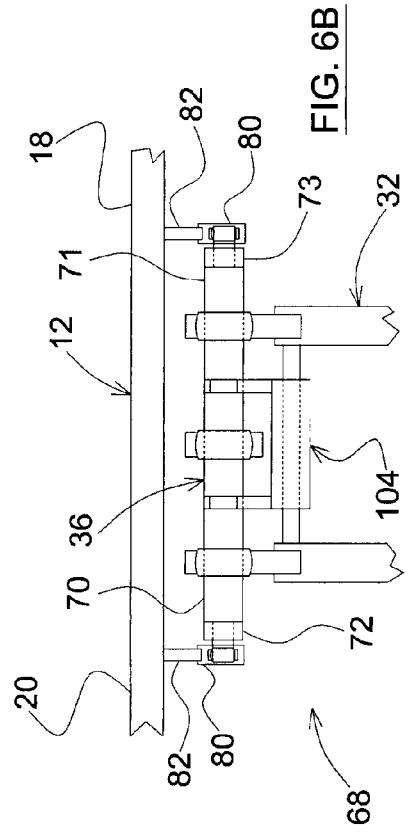

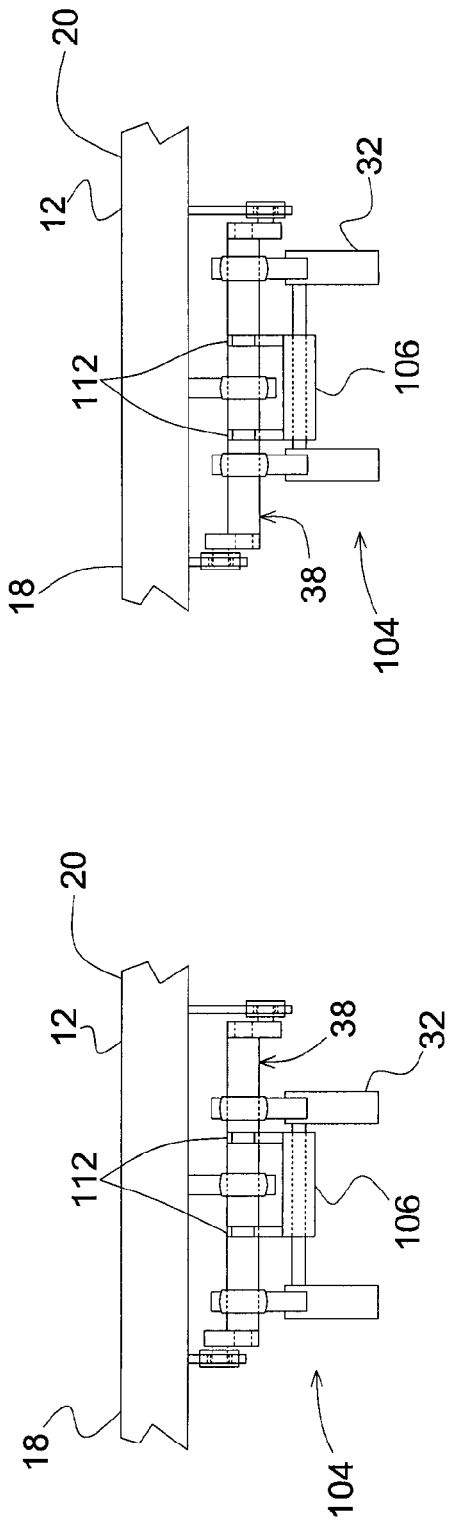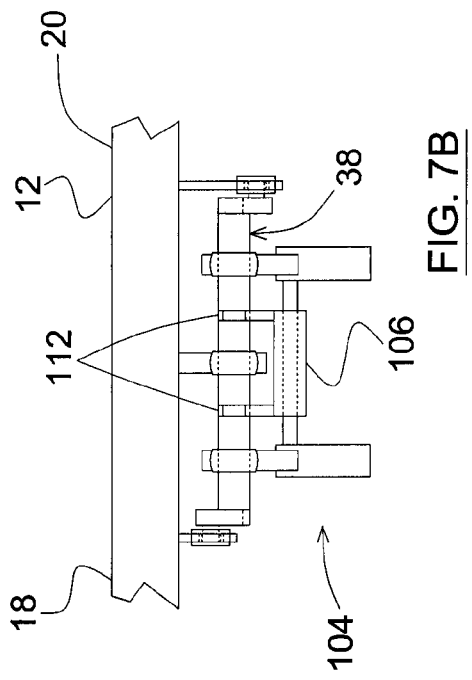

CARGO LOADER FOR AN AIRCRAFT WITH ADJUSTING MECHANISM

RELATED APPLICATIONS

This application is the U.S. National Phase under 35 U.S.C. §371 of International Application No. PCT/CA2009/001161, filed on Aug. 18, 2009, which in turn claims the benefit of U.S. Provisional application No. 61/090,046, filed on Aug. 19, 2008, the disclosures of which Applications are incorporated by reference herein.

FIELD OF THE INVENTION

The present invention generally relates to aircraft loaders for lifting cargo and freight onto and off an aircraft cargo bay. More precisely, but not exclusively, the invention concerns a transportable self-propelled aircraft loader, suitable for example in military application, and including a transversal tilting mechanism.

BACKGROUND OF THE INVENTION

Aircraft loaders are used for aircraft servicing and are designed to transfer containers, pallets, equipment and other types of goods to and from aircraft. Existing loaders usually have an elevator platform and a supporting assembly for supporting the platform, the supporting assembly being provided with actuating means for lifting or lowering the platform. The operation of the loader is controlled by a control station.

Loaders designed to service commercial aircraft are usually designed for use on a relatively flat, paved ground surface. The aircraft cargo floors they service are also generally level and parallel to the ground. However, surface conditions are quite different from those in the military domain. Military aircraft loaders must be able to work on an uneven, inclined, and rough ground surface. In addition, the cargo bays of the aircraft they service are rarely level with the platform loader, or parallel to the ground. When used for example in military applications or other applications where the loader has to travel on uneven or incline surfaces, aircraft loaders must be able to position their platform horizontally even when the ground is inclined. They must also be able to position their platform parallel to the aircraft, in cases where the aircraft is resting on inclined ground and goods must be loaded into the cargo bay. The aircraft loaders should also preferably allow lateral movement of the platform, so that once the loader has approached as close as possible to the aircraft access ramp, the platform can be adjusted laterally so as to fit properly with respect to the cargo opening and then facilitate loading of the goods into the aircraft. Finally, transverse and longitudinal tilting of the platform is also sought-after, for two reasons. Firstly, it allows the platform to be positioned to the cargo bay entrance opening. Secondly, it increases the manoeuvrability of the loader, which is important since the cargo bay entrance opening is often just a few inches larger than the overall dimension of the loader in its lowered position.

Already known in the art, such as in U.S. Pat. No. 4,662,809 (Sturtz et al., 1987), aircraft loaders are provided with a platform, a base frame or chassis and a scissor lift assembly therebetween for raising and lowering the platform. The base frame acts as a guiding rail for the scissor mechanism so that the lower end of the scissor legs slides within the base frame when moving from open to closed position and vice versa. The base frame also provides rigidity to the loader, and ensures that the movement of the scissor legs never deviates from the set straight lines.

Other versions of aircraft loaders are provided with a pair of foldable leg assemblies supporting the loading platform, different compared to scissors assembly in that each leg assembly is used to control respectively the front and the rear of the platform. These loaders do allow for longitudinal tilting of the platform, but since they have two foldable leg assemblies, they are generally bulky, heavy, and more complex to operate. U.S. Pat. No. 4,408,739 (Buschel, 1983) and U.S. Pat. No. 5,110,153 (Kallansrude et al., 1992) give examples of such loaders.

The cargo loader by Sturtz et al. or Buschel cited above, do not allow a transversal tilting of the platform relatively to the air plane. Transversal tilting is of major importance to adjust the loader deck with the aircraft cargo bay opening, specially when both aircraft and cargo loader are present on uneven, inclined, and rough ground surface.

The cargo loader by Kallansrude et al. describes an adjusting mechanism (see FIGS. 10 to 12) for transversally tilting the platform with a complex design which cannot be adapted for easy maintenance when the loader is used in difficult conditions, such as war zone.

Although several types of aircraft loaders have been developed in the past, it is believed that there is still a need for an aircraft loader better adapted to irregular or uneven ground surfaces such as the ones frequently encountered in military applications.

There is also a need for a compact and simple positioning and adjusting mechanism allowing for finer controls of the platform.

SUMMARY OF THE INVENTION

An object of the present invention is to provide an aircraft cargo loader that satisfies the above-mentioned need.

In accordance with the present invention, that object is achieved with an aircraft cargo loader comprising a longitudinal deck platform having front and rear ends, and two opposite longitudinal sides; and a supporting assembly extending under the platform for supporting and moving the deck platform between a raised position and a lowered position. The supporting assembly comprises a first and a second elongated member each pivotally attached respectively to a front and a rear transverse shaft extending underneath the platform. An adjusting mechanism is also provided for transversally tilting the platform. The adjusting mechanism comprises the front transverse shaft having a first end and a second end, each end provided with a cam extension pointing in opposite longitudinal directions. Each of the cam extensions are connected to the platform in a pivotal and a longitudinal slidable relationship. The front transverse shaft is movable in rotation between:

a. a first tilt angular position where the cam extension of the first end points upwards whereas the cam extension of the second end points downwards and where one of the longitudinal side of the platform is tilted with respect to the other longitudinal side;

b. a neutral angular position where the cam extensions are at the same level and so are the two longitudinal sides of the platform; and c. a second tilt position where the cam extension of the first end points downwards whereas the cam extension of the second end points upwards and where said other longitudinal side of the platform is tilted with respect to the one longitudinal side.

An actuator is also provided to actuate the rotational movement of the front transverse shaft.

Thanks to the adjusting mechanism described above, the deck platform can be finely controlled in order to compensate for the incline of the ground or aircraft floor. Indeed the front of the deck platform can be transversally tilted in vis-à-vis the aircraft bay opening in order to elevate one side of the platform relative to the other.

According to a preferred embodiment of the invention, each one of the cam extensions is an oblong plate having a first end secured to the front transverse shaft, and a second end provided with a transverse rod protruding outwardly, opposite the front transverse shaft. More preferably, the adjusting mechanism further comprises a pair of sliding pads. Each sliding pad is associated and slidably connected to a respective longitudinal rail affixed underneath the platform. Each of the sliding pads is also provided with a hole for receiving a corresponding one of the transverse rods in rotation.

Also preferably, the aircraft cargo loader comprises a connecting member secured to the underside of the platform and the front transverse shaft is mounted in rotation within a through hole provided in the connecting member.

Still preferably, the adjusting mechanism may comprise a lever having a fulcrum end secured to the front transverse shaft and an effort end opposite the fulcrum end; and the actuator comprises a cylinder having a first end pivotally mounted to the platform and a second end pivotally connected to the effort end of the lever.

According to a yet further preferred embodiment of the invention, the aircraft cargo loader comprises a shifting means for moving at least the front transverse shaft transversally, thereby allowing the platform to be shifted laterally relative to the supporting assembly.

The first and second elongated members each preferably consists of a pair of spaced-apart parallel arms, each arm having an upper end provided with a hole for receiving in a rotatable and slidable manner the front and rear transverse shaft respectively. In that case, the shifting means preferably comprises a controllable cylinder slidable over a cylinder shaft mounted transversally between the arms of the first elongated member close to the front transverse shaft and an extension extending from the cylinder and engaging the front transverse shaft.

More preferably, the shifting means move also the rear transverse shaft transversally. Indeed, the shifting means may comprise a controllable cylinder slidable over a cylinder shaft mounted transversally between the arms of the second elongated member close to the rear transverse shaft and an extension extending from the cylinder and engaging the rear transverse shaft.

Also preferably, the first and second elongated members are pivotally connected by a swivel joint so as to form a scissor assembly. The loader then comprises a scissor actuator to move the scissor assembly between an open and a close position where the loader is in the raised and lowered position respectively.

Preferably, one of the first and second elongated members is articulated and also comprises an upper segment pivotally connected to a lower segment. The scissor assembly may then further comprise an articulation actuator to move the upper segment relative to the lower segment so as to tilt the deck platform longitudinally.

More preferably, the articulated elongated member is the second elongated member and the articulation actuator is a controllable cylinder having a first end connected to the upper segment of the articulated elongated member and a second end connected to a lower portion of the first elongated member.

Still preferably, the aircraft cargo loader comprises a front and a rear wheel assembly unit. The second and first elongated members each has a lower end pivotally connected to the front and rear wheel assembly unit respectively.

More preferably, one of the first and second wheel assemblies is motorized, thereby allowing self propulsion of the loader.

The present invention and its advantages will be better understood and apparent upon reading the following detailed description of a preferred embodiment thereof, made with reference to the accompanying drawings.

BRIEF DESCRIPTION OF THE DRAWINGS

FIGS. 6A, 6B and 6C are various frontal views of the adjusting mechanism of FIG. 4 showing the front transverse shaft in three different angular positions which respectively causes the platform to tilt to the right (FIG. 6A), to remain horizontal (FIG. 6B) and to tilt to the left (FIG. 6C).

FIGS. 7A, 7B and 7C are various frontal views of the adjusting mechanism showing the front transverse shaft, in a right translated position (FIG. 7A); a neutral centered position (FIG. 7B) and in a left translated position (FIG. 7C).

Figure 1:
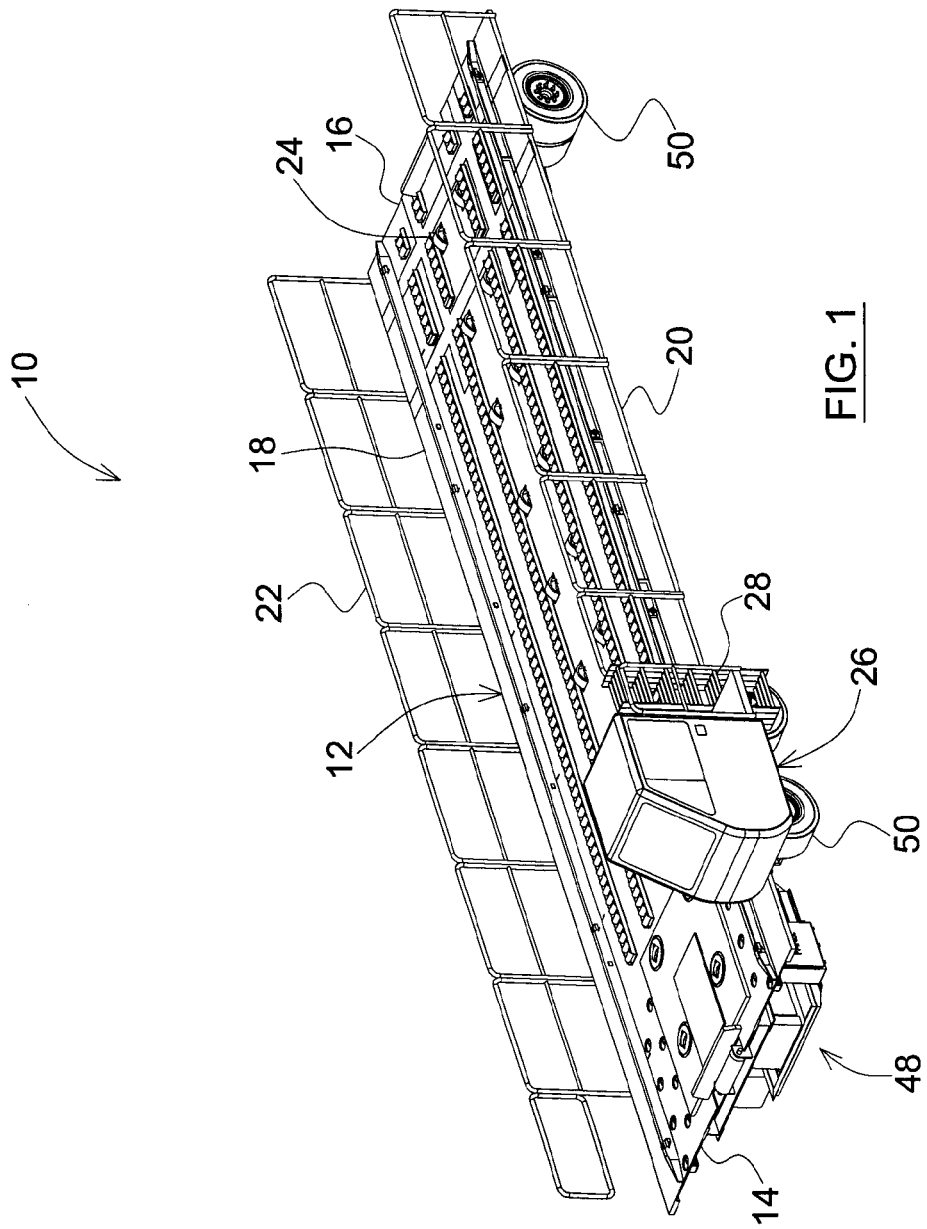
FIG. 1 is a perspective view of an aircraft loader, according to a preferred embodiment of the present invention, with its platform in a lowered position.

DESCRIPTION OF A PREFERRED
EMBODIMENT OF THE INVENTION

In the following description, similar features in the drawings have been given similar reference numerals. To preserve the clarity of the drawings, some references numerals have been omitted, if they were already identified in a preceding Figure.

As it will be appreciated from reading the following description, the aircraft loader shown in the Figures is advantageously suitable for military purposes. Indeed this loader can easily be used on uneven or inclined surfaces for loading cargo onto an aircraft whose cargo bay may not be level with the ground surface. The loader platform can advantageously be raised as well as tilted longitudinally in order to compensate for the incline of the ground or aircraft floor. The platform's movement may also be finely controlled with a mechanism that can tilt one end of the platform transversally (i.e: elevate one side of the platform relative to the other). or displaced laterally.

Figure 2:
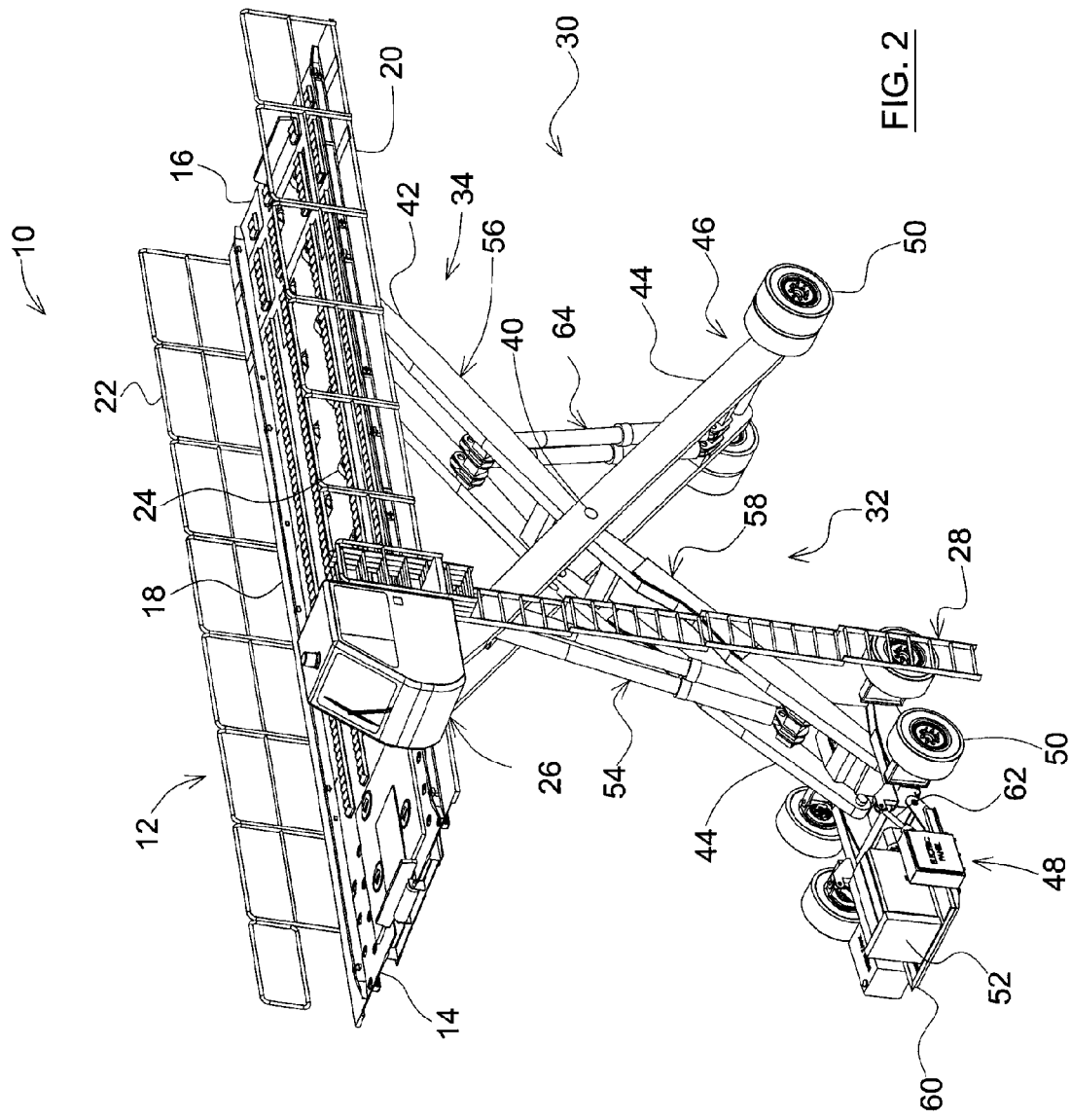
FIG. 2 is another perspective view of the aircraft loader of FIG. 1, with its platform in a raised position.

Referring to FIGS. 1 and 2, the aircraft cargo loader 10 first comprises a longitudinal deck platform 12 having front 14 and rear 16 ends, and two opposite longitudinal sides 18, 20.

The deck platform 12 is preferably provided with handrails 22 for preventing loads and operators from falling from the platform 12. The upper surface of the platform is preferably made of metal, and may be provided with dancer rolls 24, mobile rails and motorized platform wheels for facilitating the convoying of loads over the surface of the platform 12 and from the platform 12 to an aircraft cargo bay.

Adjacent to the deck platform 12 is a cabin 26 from where an operator can control the platform's movement. The cabin 26 can slide transversally over the platform 12 so as to minimize the width of the platform 12, such as is required when loading the entire aircraft loader 10 onto a plane. A retractable ladder 28 is preferably attached to the cabin for allowing operators to climb up or down from the cabin 26 when the loader is in a raised position (FIG. 2).

Figure 3:
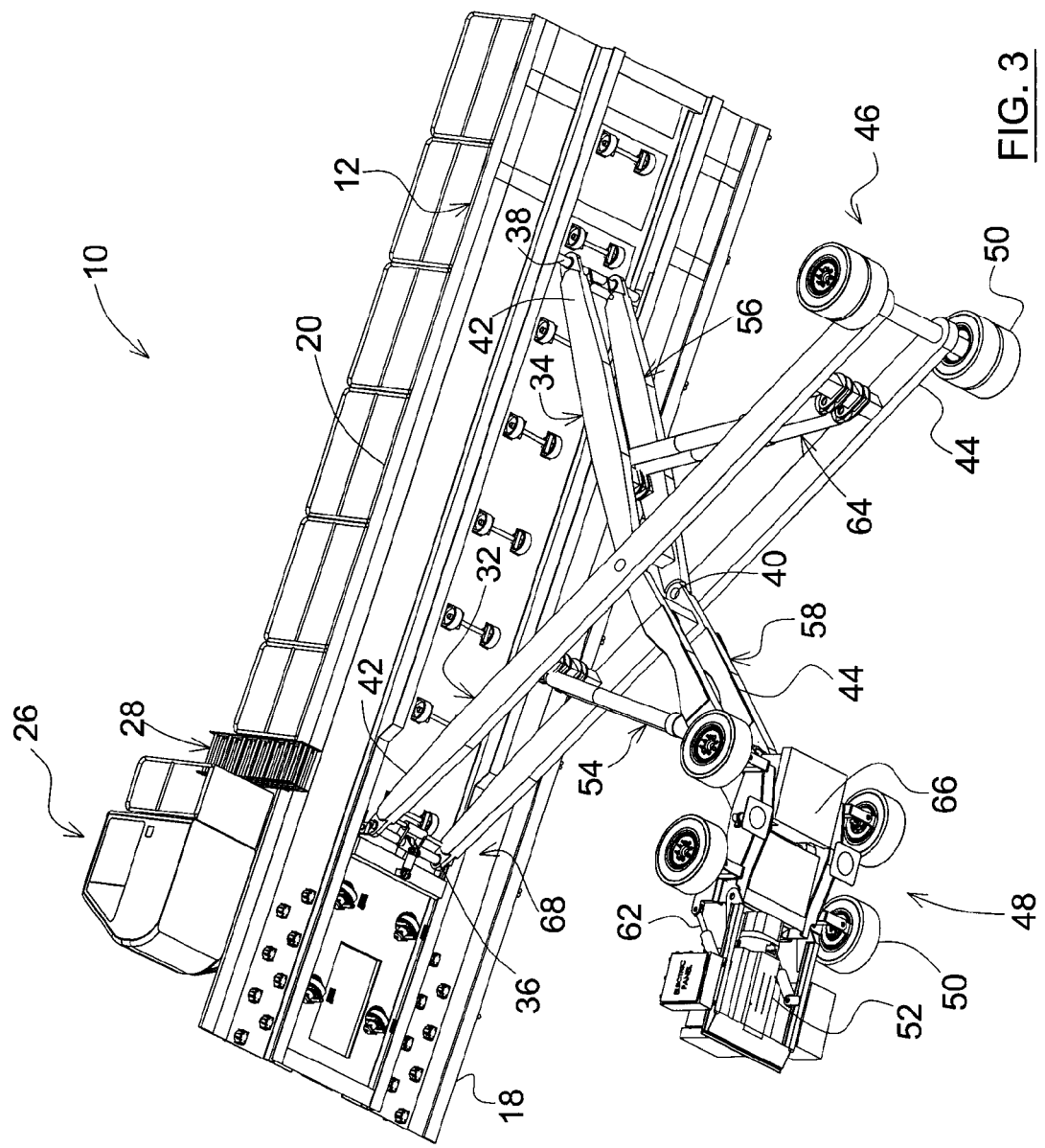
FIG. 3 is another perspective view of the aircraft loader of FIG. 2 viewed from underneath.

As best shown on FIGS. 2 and 3, a supporting assembly 30 extends under the deck platform 12 for supporting and moving the platform between a raised position (FIG. 2) and a lowered position (FIG. 1). The supporting assembly 30 comprises a first 32 and a second 34 elongated member each pivotally attached respectively to a front 36 and a rear 38 transverse shaft extending underneath the platform 12.

As illustrated on FIGS. 2 and 3, the supporting assembly may be a scissor assembly 30 extending longitudinally under the deck platform 12 and supporting it. In that particular case the first elongated member 32 and the second elongated member 34 are joined by a swivel joint 40 such as a pin or a shaft, allowing the scissor assembly 30 to move between an open position, where the deck platform 12 is in the raised position (FIG. 2) and a closed position, where the deck platform 12 is in the lowered position (FIG. 1).

In operation, the scissor assembly 30 is closed by pulling the first and the second elongated members 32 and 34 towards each other, thereby lowering the platform 12 and allowing cargo to be loaded on the platform. To unload the cargo into an aircraft, the scissor assembly 30 is opened, thereby raising the platform 12 to the level of an aircraft cargo bay.

In this preferred embodiment, best shown in FIGS. 2 and 3, the elongated members 32 and 34 are formed by a pair of spaced apart parallel legs. Other scissor assemblies involving a first 32 and a second 34 elongated members may also be considered. For example, the first member of the scissor assembly may be formed by a rectangular elongated frame and the second member formed by an elongated metal board pivotally inserted within such frame, both members being pivotable about a swivel shank or pin. Elongated members may also be replaced by a pair of foldable leg assemblies, such as those described in U.S. Pat. Nos. 4,408,739 or 5,110,153 cited above.

In the example illustrated, each of the first 32 and second 34 elongated member has an upper end 42 pivotally attached to the deck platform 12 and a lower end 44 pivotally connected to a first wheel assembly 46 and a second wheel assembly 48 respectively. At least one of the first 46 and second 48 wheel assemblies is motorized, thereby allowing self propulsion of the loader. In the illustrated embodiment, it is the second wheel assembly 48 located at the lower end 44 of the second elongated member 34, which is motorized.

Having the second wheel assembly 48 motorized at the ground level also provides rigidity and stability to the loader 10. The friction between the wheels 50 of the second wheel assembly 48 and the ground replaces the guiding element which was traditionally provided by a guiding rail frame or cross-members (see for example U.S. Pat. No. 4,662,809). In other words, having one set of motorized wheel assembly allows the loader to work without any frame, and without any cross-members.

A diesel motor 52 is preferably used to motorize the second wheel assembly 48, but an electric motor could be used as well. The diesel motor 52 may be mounted on a platform 60 connected to the second wheel assembly 48.

The second wheel assembly 48 may be also provided with hydraulic brakes for braking or preventing the movement of the wheels. Of course, the first or rear wheel assembly 46 may be motorized instead of the second wheel assembly 48. In yet another configuration, both first and second wheel assemblies 46, 48 may be motorized.

As shown in FIGS. 2 and 3, a first actuator 54 may be used to actuate the movement of the scissor assembly 30 between the open and closed positions. The first actuator 54 is preferably a hydraulic cylinder attached to a shaft placed between the legs of the lower section of the second member 34 and extending to another shaft placed between the legs of the upper section of the first member 32.

As shown in FIG. 23 and also 9, the second elongated member 34 may be articulated and formed by an upper section 56 that is pivotally connected to a lower section 58 by means for example of the swivel shaft 40. This particular configuration allows longitudinal tilting of the platform 12 meaning that the rear end 16 of the platform 12 can be lowered relative to the front end 14 and vice versa. This articulation is particularly advantageous when, for example, the loader 10 must transport a load over a slope, since it keeps the deck platform 12 and its cargo horizontally level, even if the wheel assemblies 46, 48 are at different heights. In such situations, the motor platform 60 on which the motor 52 is placed can also tilt longitudinally to follow the ground incline. Two hydraulic jacks 62 allow for this tilting movement of the motor platform 60.

In another example, the articulation of the second elongated member 34 is also useful when the loader must be loaded into an aircraft, and when the aircraft stands on an inclined ground surface. An operator can adjust the level of the deck platform 12 to make it parallel to the aircraft cargo floor by manoeuvring the upper section 56 of the second elongated member 34 over the aircraft access ramp, and then into the plane. Of course, in other embodiments of the invention, the first elongated member 32 may be articulated, or both the first 32 and the second 34 members could be articulated.

As illustrated, a second actuator 64 is used for moving the upper section 56 of the second elongated member 34 relative to the lower section 58. The second actuator 64 is preferably a hydraulic cylinder attached to a shaft placed between the legs of the lower section 44 of the first member 32 and extending to another shaft placed between the legs of the upper section 42 of the second member 34. A hydraulic reservoir 66, which can be seen in FIG. 3, may be placed near the second wheel assembly 48 to provide fluids to the first actuator 54 and the second actuator 64 of the loader 10.

Detailed Description of the Adjusting Mechanism According to a Preferred Mode of Realization As mentioned above, the cargo loader is also provided with an adjusting mechanism 68 to finely control the transversal tilt of the deck platform 12 and optionally its transversal displacement. A preferred mode of realization of this adjustment mechanism 68 will now be described in more details.

Figure 4A:
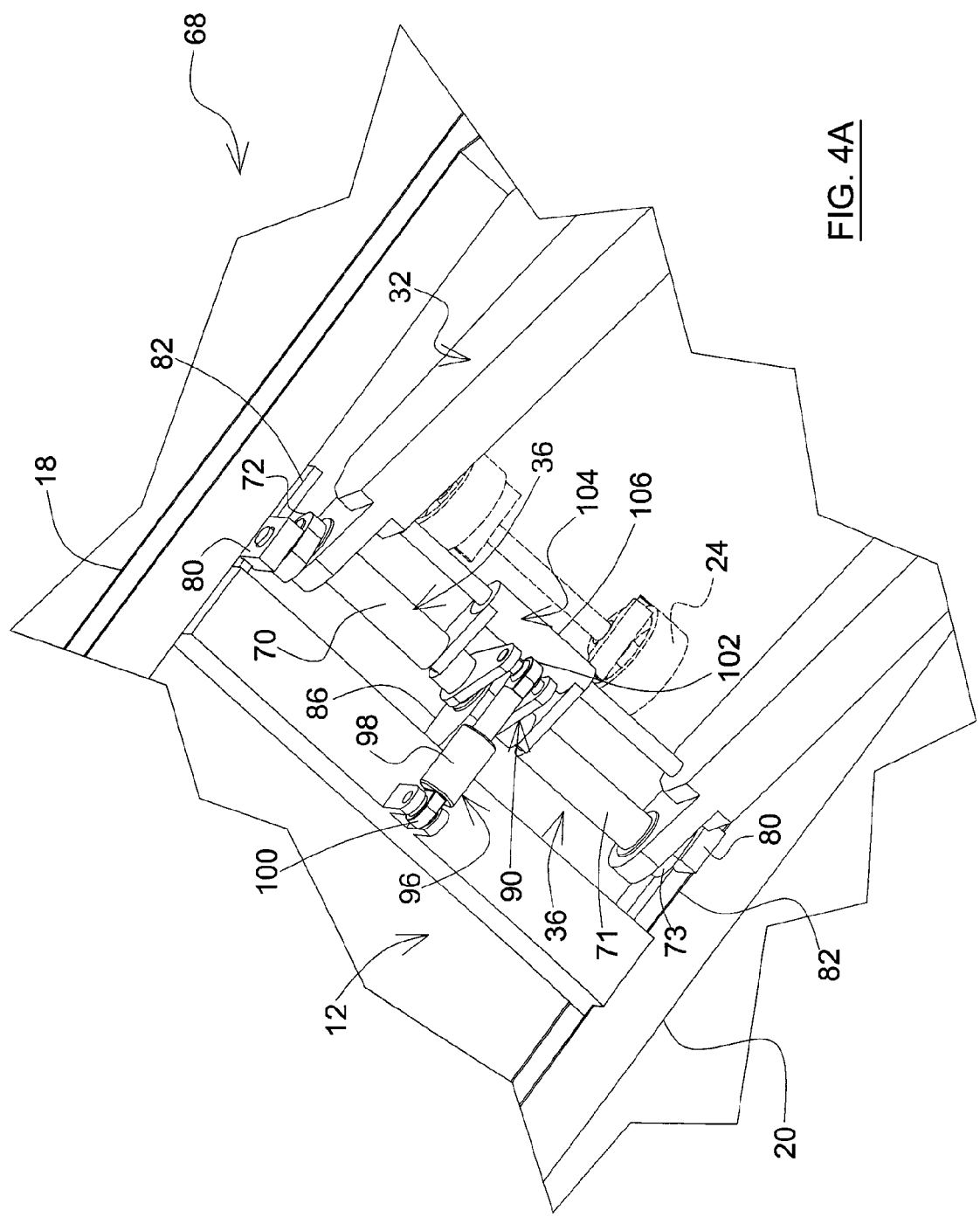
FIG. 4A is an enlarged perspective view of FIG. 3, showing the adjusting mechanism according to a preferred variant, wherein the cylinder used for rotating the transversal shaft is in a stretched position.
Figure 4B:
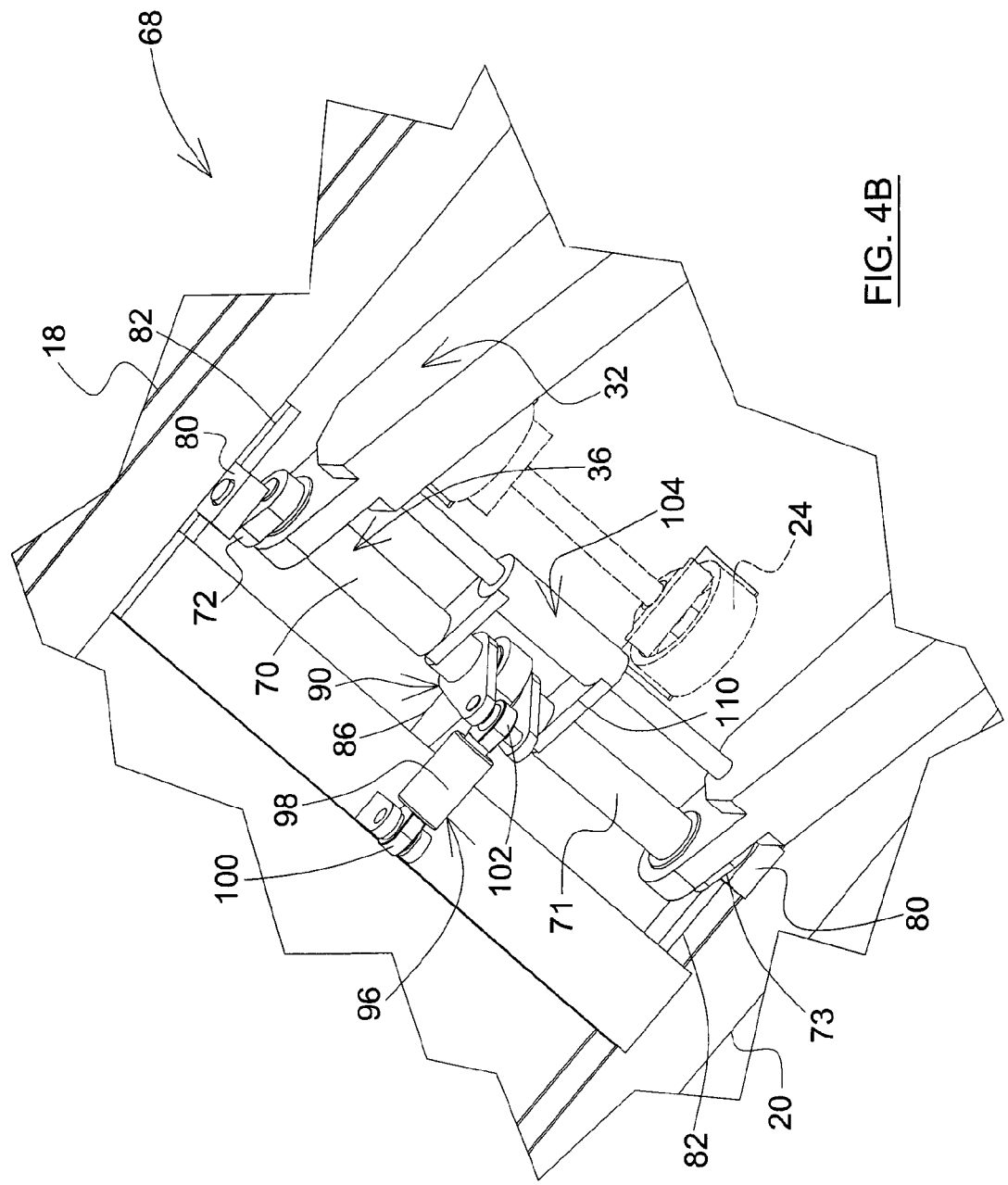
FIG. 4B is the same view as FIG. 4A, showing the cylinder in a retracted position.
Figure 5:
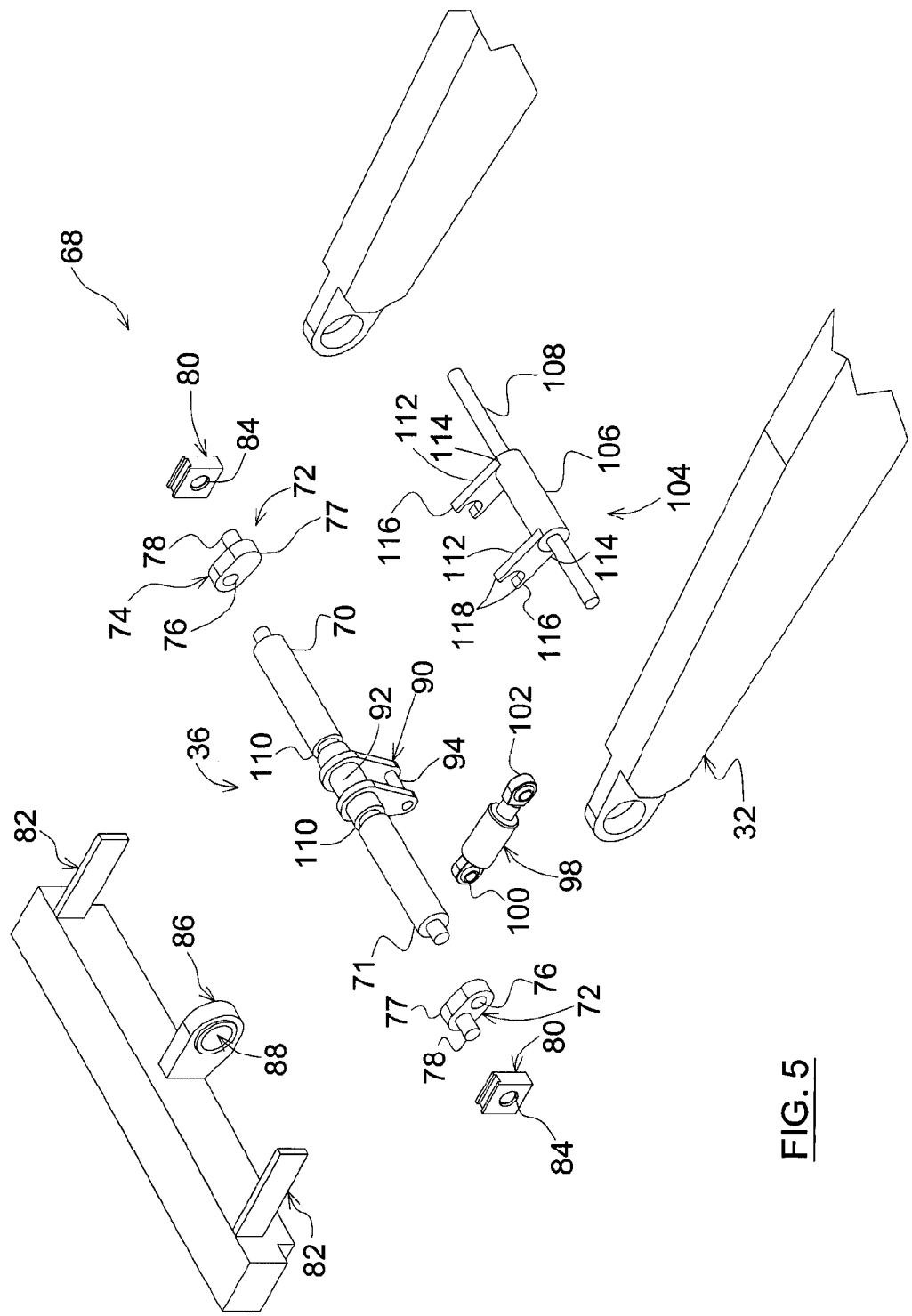
FIG. 5 is an exploded view of the adjusting mechanism of FIG. 4.

Turning to FIGS. 4 to 6, the adjustment mechanism 68 first comprises the front transverse shaft 36 of the first elongated member 32 having a first end 70 and a second end 71, each end provided with a cam extension 72, 73 pointing in opposite longitudinal directions. Each of the cam extensions 72, 73 are connected to the deck platform 12 in a pivotal and a longitudinal slidable relationship.

Referring to FIGS. 6A, 6B and 6C, the front transverse shaft 36 is movable in rotation between a first or right tilt angular position (FIG. 6A); a neutral angular position (FIG. 6B) and a second or left tilt position (FIG. 6C).

In the first tilt angular position, as in FIG. 6A, the cam extension 72 of the first end 70 points upwards whereas the cam extension 73 of the second end 71 points downwards, thereby causing one of the longitudinal side 20 of the platform 12 to be tilted with respect to the other longitudinal side 18.

In the neutral angular position, as in FIG. 6B, the cam extensions 72, 73 are at the same level and so are the two longitudinal sides 18, 20 of the platform.

In the second tilt position, as in FIG. 6C, the cam extension 72 of the first end 70 points downwards whereas the cam extension 73 of the second end 71 points upwards, thereby causing the other longitudinal side 18 of the platform 12 to be tilted with respect to said one longitudinal side 20.

As shown in FIGS. 4 and 5, each one of the cam extensions 72, 73 may be an oblong plate 74 having a first end 76 secured to the front transverse shaft 36, and a second end 77 provided with a transverse rod 78 protruding outwardly, opposite the front transverse shaft 36. More preferably, the adjusting mechanism comprises a pair of sliding pads 80. Each sliding pad 80 is associated and slidably connected to a respective longitudinal rail 82 affixed underneath the platform 12. Each of the sliding pads 80 is also provided with a hole 84 for receiving a corresponding one of the transverse rods 78 in rotation.

As best viewed in FIG. 5, the front transverse shaft 36 is mounted in rotation within a through hole 88 provided in a connecting member 86 secured to the underside of the platform; and the actuation of the rotational movement of the front shaft 36 is preferably provided thanks to the combined action of a lever 90 connected to the front transverse shaft 36 and an actuator operatively connected to the lever 90. More specifically, the lever 90 has a fulcrum end 92 secured to the front transverse shaft 36 and an effort end 94 opposite the fulcrum end 92; and the actuator is preferably a cylinder 98, such as an hydraulic cylinder, having a first end 100 pivotally mounted to the platform 12, as shown in FIGS. 4A and 4B, and a second end 102 pivotally connected to the effort end 94 of the lever 90. The controlled movement of the cylinder 98 causes the lever 90 to pivot about the fulcrum end 92, thereby causing the front transverse shaft 36 to rotate between the above mentioned first tilt angular position, neutral angular position and second tilt position, and thus to tilt one longitudinal side of the platform 12 relative to the other 18, 20. This movement is transferred to the cam extension 72, that can slide on the longitudinal rails 82 of the platform 12 thanks to the sliding pads 80.

As also illustrated on FIGS. 4, 5 and 7, the aircraft cargo may further comprise a shifting means 104 for moving at least the front transverse shaft 36 transversally, thereby allowing the platform 12 to be shifted laterally relative to the supporting assembly 30.

As illustrated, the shifting means 104 preferably comprises a controllable cylinder 106 slidable over a cylinder shaft 108 mounted transversally between the arms of the first elongated member 32 close to the front transverse shaft 36 and an extension extending from the cylinder 106 and engaging the front transverse shaft 36. Referring to FIGS. 7A, 7B and 7C, the front transverse shaft 36 may be shifted between a first transversal position (FIG. 7A); a neutral transversal position (FIG. 7B) and a second transversal position (FIG. 7C).

As best viewed from FIG. 5, the front transverse shaft 36 is provided with two annular grooves 110 and the extension is preferably a pair of arms 112 each being associated with one of the grooves 110 respectively. Each arm has one end 114 secured to the cylinder 106 and the other end 116 engaging the transverse shaft 36. In order to engage the shaft 36, that other end 116 of each arm 112 may have the shape of a fork with two prongs 118 sized to fit within a respective groove 110. As can be appreciated by referring to FIG. 7, when the controllable cylinder 106 slides on the cylinder shaft 108, the arms 112 which engages the front transverse shaft 36 causes the same to be shifted transversally with respect the elongated member 32.

Figure 8:
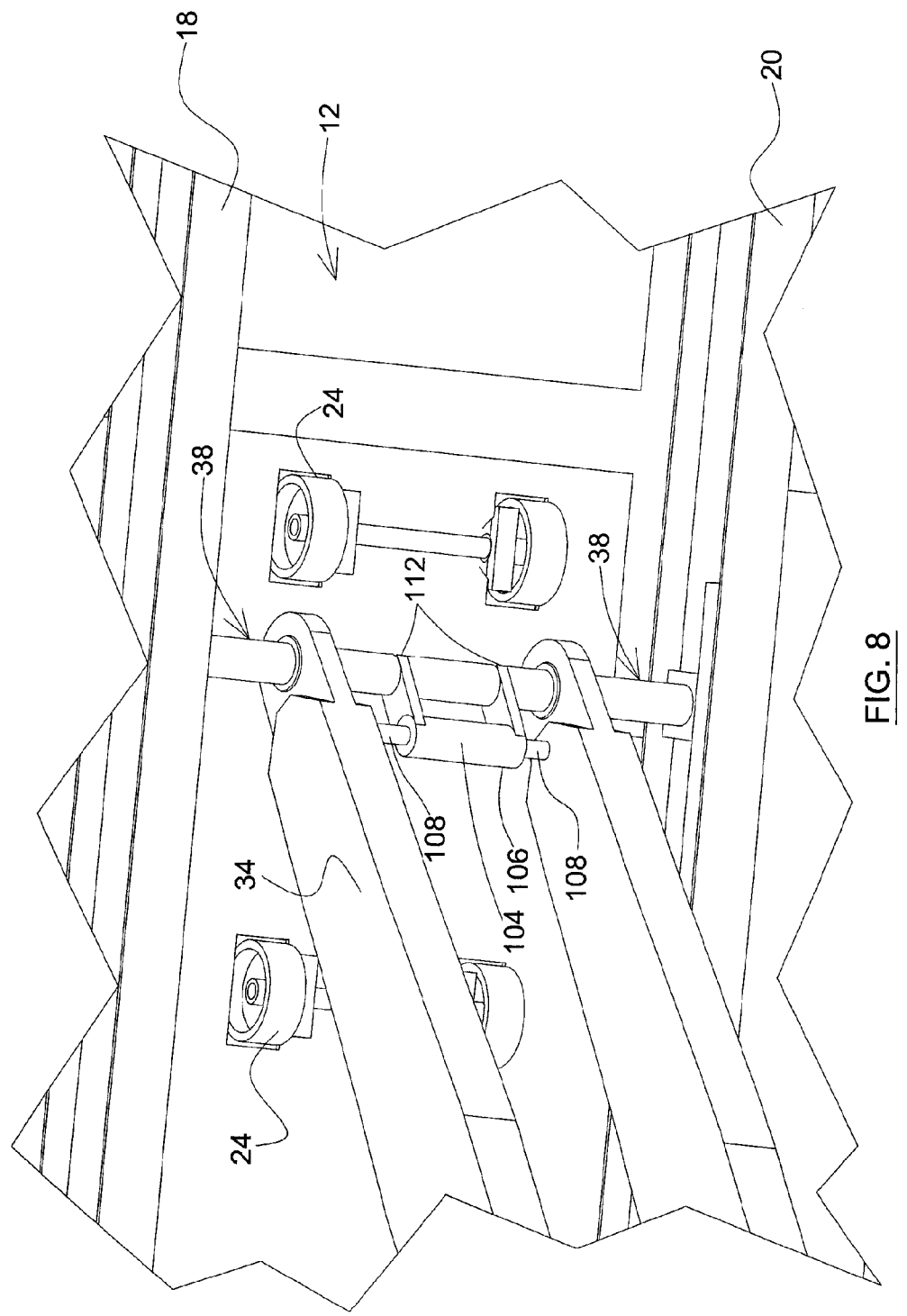
FIG. 8 is still an enlarged perspective view of FIG. 3, showing the rear transverse shaft.
Figure 9A:
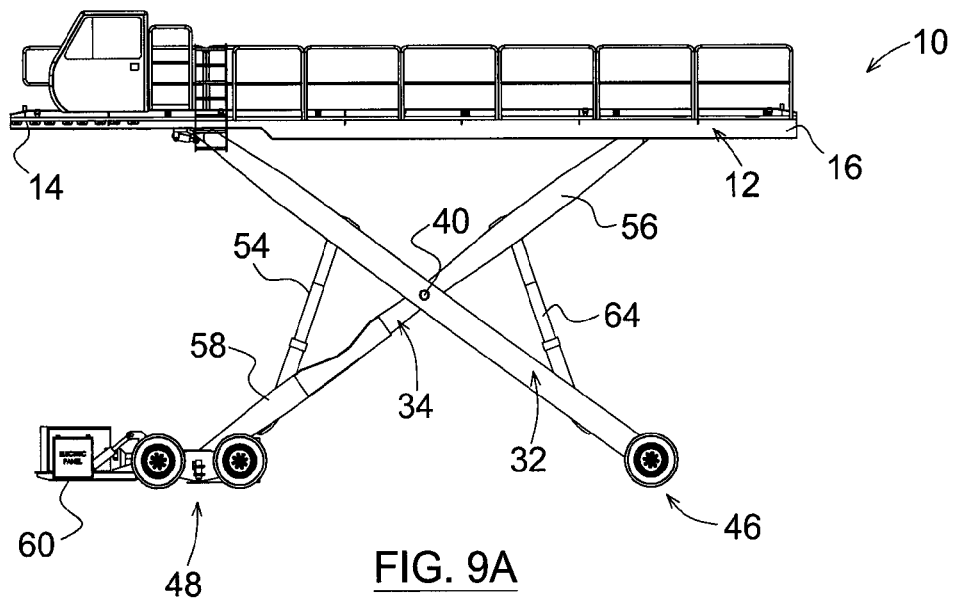
FIGS. 9A and 9B are side elevation views of the aircraft loader to FIG. 1 in a raised horizontally position (FIG. 9A) and in a raised longitudinally tilted position (FIG. 9B).
Figure 9B:
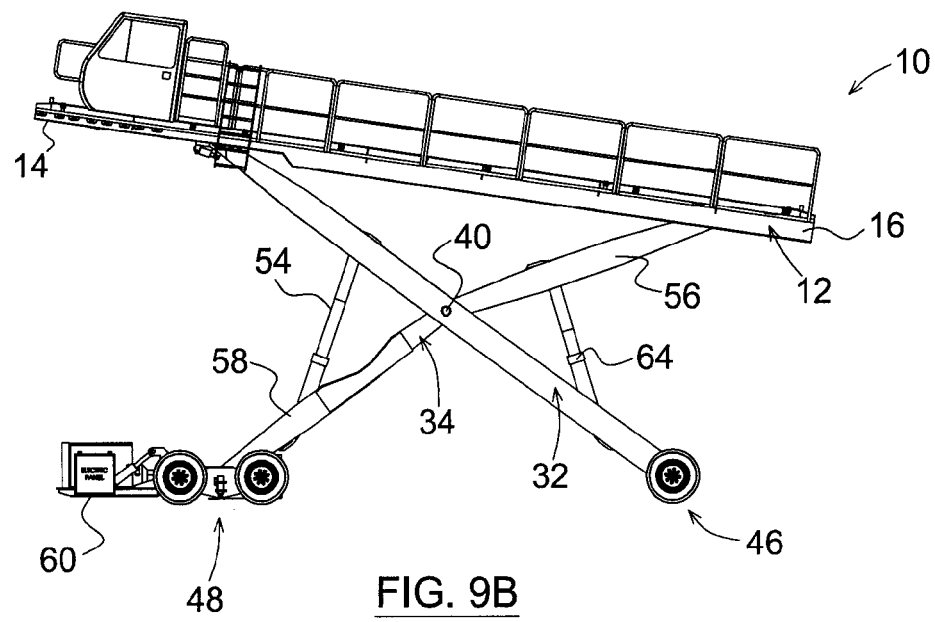

As illustrated in FIG. 8, the cargo loader 10 may also comprise another shifting means 104 identical to the shifting means used at the front transverse shaft 36, in order to move also the rear transverse shaft 38 transversally with respect to the second elongated member 34.

As can be appreciated from the above description, the cargo loader may comprises from one to three adjusting mechanisms allowing the platform to be adjusted longitudinally, laterally and/or transversally allowing a combined tilting, lifting and sliding movement of at least one end of the platform. The advantage of this combination of elements is that when cargo is loaded into the aircraft, the cargo loader can easily follow the movement of the floor of the aircraft, commonly known in the art as the aircraft attitude.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:
1. An aircraft cargo loader comprising:
 a longitudinal deck platform having front and rear ends, and two opposite longitudinal sides;
 a supporting assembly extending under the platform for supporting and moving the deck platform between a raised position and a lowered position, the supporting assembly comprising a first and a second elongated member each pivotally attached respectively to a front and a rear transverse shaft extending underneath the platform;
 an adjusting mechanism for transversally tilting the platform, comprising:
  the front transverse shaft having a first end and a second end, each end provided with a cam extension pointing in opposite longitudinal directions;
  each of said cam extensions being connected to the platform in a pivotal and a longitudinal slidable relationship;
  said front transverse shaft being movable in rotation between:
   a. a first tilt angular position where the cam extension of the first end points upwards whereas the cam extension of the second end points downwards and where one of said longitudinal side of the platform is tilted with respect to the other longitudinal side;
   b. a neutral angular position where the cam extensions are at the same level and so are the two longitudinal sides of the platform; and
   c. a second tilt position where the cam extension of the first end points downwards whereas the cam extension of the second end points upwards and where said other longitudinal side of the platform is tilted with respect to said one longitudinal side; and an actuator to actuate the rotational movement of the front transverse shaft.

2. An aircraft cargo loader according to claim 1, wherein each one of the cam extensions is an oblong plate having a first end secured to the front transverse shaft, and a second end provided with a transverse rod protruding outwardly, opposite the front transverse shaft.

3. An aircraft cargo loader according to claim 2, wherein the adjusting mechanism further comprises a pair of sliding pads, each sliding pad being associated and slidably connected to a respective longitudinal rail affixed underneath the platform, each of the sliding pads being also provided with a hole for receiving a corresponding one of the transverse rods in rotation.

4. An aircraft cargo loader according to any one of claims 1 to 3, comprising a connecting member secured to the underside of the platform, the front transverse shaft being mounted in rotation within a through hole provided in the connecting member.

5. An aircraft cargo loader according to claim 1, wherein the adjusting mechanism comprises a lever having a fulcrum end secured to the front transverse shaft and an effort end opposite the fulcrum end, and the actuator comprises a cylinder having a first end pivotally mounted to the platform and a second end pivotally connected to the effort end of the lever.

6. An aircraft cargo loader according to claim 1, further comprising a shifting means for moving at least the front transverse shaft transversally, thereby allowing the platform to be shifted laterally relative to the supporting assembly.

7. An aircraft cargo loader according to claim 6, wherein the first and second elongated members each consists of a pair of spaced-apart parallel arms each arm having an upper end provided with a hole for receiving in a rotatable and slidable manner the front and rear transverse shaft respectively, and the shifting means comprises a controllable cylinder slidable over a cylinder shaft mounted transversally between the arms of the first elongated member close to the front transverse shaft and an extension extending from the cylinder and engaging the front transverse shaft.

8. An aircraft cargo loader according to claim 7, wherein the shifting means is moving also the rear transverse shaft transversally, the shifting means comprising a controllable cylinder slidable over a cylinder shaft mounted transversally between the arms of the second elongated member close to the rear transverse shaft and an extension extending from the cylinder and engaging the rear transverse shaft.

9. An aircraft cargo loader according to claim 1, wherein the first and second elongated member are pivotally connected by a swivel joint so as to form a scissor assembly, and the loader comprises a scissor actuator to move the scissor assembly between an open and a close position where the loader is in said raised and lowered position respectively.

10. An aircraft cargo loader according to claim 9, wherein one of the first and second elongated members is articulated and comprises an upper segment pivotally connected to a lower segment and wherein the scissor assembly further comprises an articulation actuator to move the upper segment relative to the lower segment so as to tilt the deck platform longitudinally.

11. An aircraft cargo loader according to claim 10, wherein said articulated elongated member is the second elongated member and the articulation actuator is a controllable cylinder having a first end connected to the upper segment of the articulated elongated member and a second end connected to a lower portion of the first elongated member.

12. An aircraft cargo loader according to claim 1, comprising a front and a rear wheel assembly unit; and the second and first elongated members each has a lower end pivotally connected to the front and rear wheel assembly unit respectively.

13. An aircraft cargo loader according to claim 12, wherein one of the first and second wheel assemblies is motorized, thereby allowing self propulsion of the loader.

\* \* \* \* \*